(12) United States Patent
Zang et al.

(10) Patent No.: US 10,571,752 B2
(45) Date of Patent: Feb. 25, 2020

(54) SEALANT COMPOSITION, SEALANT AND MANUFACTURING METHOD THEREOF, AND DISPLAY PANEL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Yuansheng Zang, Beijing (CN); Chun Wang, Beijing (CN); Yuanhui Guo, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 43 days.

(21) Appl. No.: 15/744,447

(22) PCT Filed: Jul. 28, 2017

(86) PCT No.: PCT/CN2017/094821
§ 371 (c)(1),
(2) Date: Jan. 12, 2018

(87) PCT Pub. No.: WO2018/040812
PCT Pub. Date: Mar. 8, 2018

(65) Prior Publication Data
US 2018/0373072 A1     Dec. 27, 2018

(30) Foreign Application Priority Data

Aug. 29, 2016   (CN) .......................... 2016 1 0756626

(51) Int. Cl.
*G02F 1/1339* (2006.01)
*C09K 3/10* (2006.01)

(52) U.S. Cl.
CPC .............. *G02F 1/1339* (2013.01); *C09K 3/10* (2013.01); *G02F 2001/13398* (2013.01); *G02F 2202/28* (2013.01)

(58) Field of Classification Search
CPC ................................ G02F 1/1339–2001/13398
See application file for complete search history.

(56) References Cited

U.S. PATENT DOCUMENTS

2015/0062524 A1\*   3/2015   Kim ...................... G02F 1/1339
                                                          349/153

FOREIGN PATENT DOCUMENTS

CN         104845548 A       8/2015
CN         105176425 A      12/2015
(Continued)

OTHER PUBLICATIONS

Machine translation of JP 2004-149355 A (Year: 2004).\*
International Search Report and Written Opinion dated Oct. 19, 2017; PCT/CN2017/094821.

*Primary Examiner* — Ramsey Zacharia
(74) *Attorney, Agent, or Firm* — Ladas & Parry LLP

(57) ABSTRACT

A sealant composition, a sealant and a manufacturing method thereof, and a display panel are provided. The sealant composition includes a non-polar component, and the non-polar component includes a material with high specific surface area. The material with high specific surface area in the sealant can be effectively used to eliminate a visual Morie phenomenon caused by the rebound after liquid crystal contacting the sealant.

5 Claims, 1 Drawing Sheet

(56) References Cited

FOREIGN PATENT DOCUMENTS

| | | | |
|---|---|---|---|
| CN | 105182623 A | | 12/2015 |
| CN | 105505264 A | | 4/2016 |
| CN | 106200136 A | | 12/2016 |
| JP | 2004149355 A | * | 5/2004 |
| KR | 20030010024 A | | 2/2003 |

* cited by examiner

SEALANT COMPOSITION, SEALANT AND MANUFACTURING METHOD THEREOF, AND DISPLAY PANEL

CROSS REFERENCE FOR RELATED APPLICATIONS

The present application claims the priority of the Chinese Patent Application No. 201610756626.4 filed on Aug. 29, 2016, which is incorporated herein by reference as part of the disclosure of the present application.

TECHNICAL FIELD

Embodiments of the present disclosure relate to a sealant composition, a sealant and a manufacturing method thereof, and a display panel.

BACKGROUND

A Thin Film Transistor Liquid Crystal Display (TFT-LCD) has advantages of small size, low power consumption, no radiation, etc., has gained fast development in recent years, and has become a mainstream of displays on the market. Along with rapid development of the TFT-LCD, terminal products such as mobile phones and tablet computers are gradually developed to be face-mounted from frame-mounted to meet consumer's requirements on quality.

SUMMARY

An embodiment of the present disclosure provides a sealant composition, comprising a non-polar component, wherein the non-polar component includes a material with high specific surface area.

In an embodiment of the present disclosure, for example, a specific surface area of the material with high specific surface area is from 200 $m^2/g$ to 1400 $m^2/g$.

In an embodiment of the present disclosure, for example, a specific surface area of the material with high specific surface area is from 200 $m^2/g$ to 1400 $m^2/g$.

In an embodiment of the present disclosure, for example, the material with high specific surface area comprises at least one selected from the group consisting of activated carbon, zeolite, aerogel and organometallic complex.

In an embodiment of the present disclosure, for example, the sealant composition further comprising a polar component, wherein a mass ratio of the polar component to the non-polar component is from 20:1 to 5:1.

In an embodiment of the present disclosure, for example, the material with high specific surface area includes a surfaced-modified material with high specific surface area.

An embodiment of the present disclosure provides a sealant, comprising a sealant main body and a first non-polar component enrichment layer located on a side of the sealant main body, wherein the first non-polar component enrichment layer comprises a non-polar component and the non-polar component is a material with high specific surface area.

In an embodiment of the present disclosure, for example, a thickness of the first non-polar component enrichment layer is from 5 μm to 35 μm.

In an embodiment of the present disclosure, for example, the sealant main body comprises a polar component.

In an embodiment of the present disclosure, for example, in the sealant, a mass ratio of the polar component to the non-polar component is from 20:1 to 5:1.

In an embodiment of the present disclosure, for example, the sealant further comprising a second non-polar component enrichment layer, wherein the second non-polar component enrichment layer is disposed on a side of the sealant main body opposite to the side of the sealant main body where the first non-polar component enrichment layer is formed.

An embodiment of the present disclosure provides a manufacturing method for a sealant, comprising mixing a polar component and a non-polar component into a sealant mixed solution, the non-polar component comprising a material with high specific surface area; and coating the sealant mixed solution on a substrate to form a sealant main body and a first non-polar component enrichment layer located on a side of the sealant main body.

In an embodiment of the present disclosure, for example, a mass ratio of the polar component to the non-polar component is from 20:1 to 5:1.

In an embodiment of the present disclosure, for example, a second non-polar component enrichment layer is formed on a side of the sealant main body opposite to the side of the sealant main body where the first non-polar component enrichment layer is formed during the formation of the first non-polar component enrichment layer.

In an embodiment of the present disclosure, for example, the sealant mixed solution is coated on an edge of the substrate.

An embodiment of the present disclosure provides a display panel, comprising a first substrate and a second substrate disposed oppositely, liquid crystal disposed between the first substrate and the second substrate and a sealant disposed on an edge of the first substrate or the second substrate, the sealant comprises a sealant main body and a first non-polar component enrichment layer, the first non-polar component enrichment layer is located on a side of the sealant close to the liquid crystal, and the first non-polar component enrichment layer comprises a material with high specific surface area.

In an embodiment of the present disclosure, for example, a thickness of the first non-polar component enrichment layer is from 5 μm to 35 μm.

In an embodiment of the present disclosure, for example, a specific surface area of the material with high specific surface area is from 200 $m^2/g$ to 1400 $m^2/g$.

In an embodiment of the present disclosure, for example, the material with high specific surface area comprises at least one selected from the group consisting of activated carbon, zeolite, aerogel and organometallic complex.

In an embodiment of the present disclosure, for example, the display panel further comprising a polar component, wherein a mass ratio of the polar component to the non-polar component in the sealant is from 20:1 to 5:1.

In an embodiment of the present disclosure, for example, the display panel further comprising a groove portion, wherein the groove portion is disposed on at least one of the first substrate and the second substrate, and part of the sealant main body is in the groove portion.

In an embodiment of the present disclosure, for example, a width of the groove portion is from 50 μm to 500 μm.

BRIEF DESCRIPTION OF THE DRAWINGS

In order to clearly illustrate the technical solution of the embodiments of the disclosure, the drawings of the embodiments will be briefly described in the following, it is obvious

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one.

Sealant components adopted in a lamination process generally include epoxy resin, acrylate, a photoinitiator and a thermal hardening agent, while all above component materials are polar materials.

Figure 1:
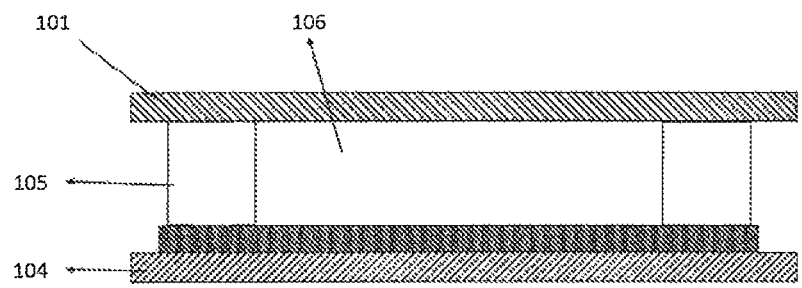
FIG. 1 is a sectional structural schematic diagram of a liquid crystal display panel.

FIG. 1 is a sectional structural schematic diagram of a liquid crystal display panel. Generally, after a display product is fully laminated, under action of an external force, liquid crystal in a cell will be diffused to both sides rapidly to impact against the sealant and is then rebounded, which generates a Morie phenomenon visually, thereby severely affecting a product's display effect and customer experience.

Usually, a material with high specific surface area may be added in the sealant, and an adsorption action of the material with high specific surface area for the liquid crystal is used, to achieve the effects of relieving the liquid crystal rebound and reducing the Morie phenomenon.

For example, the material with high specific surface area may be coated between the sealant and the liquid crystal. Such method has problems that a extra coating process needs to be added, and a coating layer having an independent material with high specific surface area easily pollutes the liquid crystal.

For another example, the material with high specific surface area may be uniformly dispersed in gel. A mixture of the material with high specific surface area and the sealant is coated. This method is a simple process, but a use rate of the material with high specific surface area is low, only components on a surface of the sealant can be effective, the components dispersed in the gel are not effective, and an adhesive force of the sealant is reduced.

At least one embodiment of the present disclosure provides a sealant composition, comprising a polar component and a non-polar component. For example, the polar component includes epoxy resin, acrylate, photoinitiator and thermal hardening agent, but not limited thereto.

Figure 2:
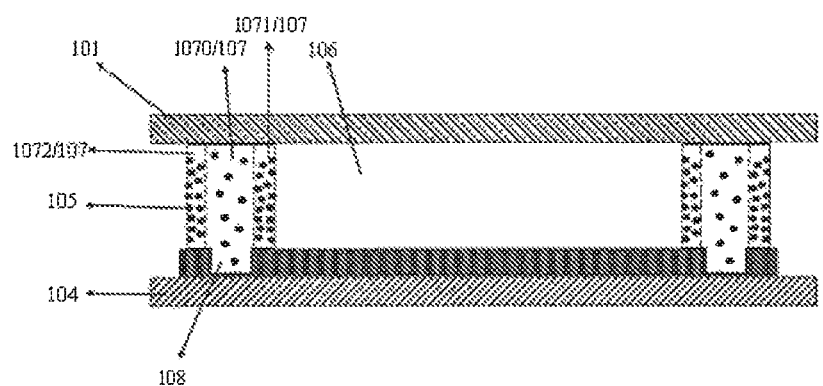
FIG. 2 is a sectional structural schematic diagram of a sealant/liquid crystal display panel provided by an embodiment of the present disclosure.

The sealant composition provided by at least one embodiment of the present disclosure may form a sealant 107 as shown in FIG. 2. The sealant 107 comprises a sealant main body 1070 and a first non-polar component enrichment layer 1071 located on a side of the sealant main body 1070.

For example, at least one embodiment of the present disclosure provides a manufacturing method for a sealant, which comprises:

Mixing a polar component and a non-polar component into a sealant mixed solution, wherein the non-polar component comprises a material with high specific surface area; and Coating the sealant mixed solution on a substrate to form the sealant main body 1070 and the first non-polar component enrichment layer 1071 on a side of the sealant main body 1070.

For example, the polar component and the non-polar component will repulse each other when mixed, and are automatically separated to form different layers, and in order for a system to maintain lower interface energy, the non-polar component having lower interface energy will be spontaneously spread on the outer side of a part of the sealant main body 1070 not adhered to the substrate (the side surface of the sealant main body). One side of the sealant close to the liquid crystal may be caused to have the spontaneously formed first non-polar component enrichment layer 1071, and the non-polar component enrichment layer comprises a material with high specific surface area 105.

For example, the material with high specific surface area 105 may comprise a surface-modified material with high specific surface area, but not limited thereto. The non-polar component has an adsorption action for the liquid crystal. The liquid crystal may be adsorbed by using the adsorption action of the material with high specific surface area to relieve the liquid crystal rebound and reduce the Morie phenomenon. When the pressure is released, the liquid crystal in the material with high specific surface area is gradually separated out to keep a cell thickness to be constant.

For example, when the material with high specific surface area is an organometallic complex, and when groups of an organic framework are non-polar, the material with high specific surface area can be directly added into the sealant composition without surface modification. That is, the material with high specific surface area comprises the organometallic complexes, and the groups of the organic framework are non-polar.

For example, a specific surface area of the material with high specific surface area is from 200 $m^2/g$ to 1400 $m^2/g$.

For example, the material with high specific surface area comprises one or more of activated carbon, zeolite, aerogel or organometallic complexes. Zeolite and organometallic complexes are ordered porous material with high specific surface area, can shape-selectively adsorb liquid crystal molecules and have high adsorption efficiency. Activated carbon and aerogel are disordered porous material with high specific surface area and have small desorption steric hindrance after adsorbing the liquid crystal, and liquid crystal is more easily restored to an initial state after removal of an external force.

For example, in the sealant composition, a mass ratio of the polar component to the non-polar component may be from 20:1 to 5:1, but not limited thereto.

At least one embodiment of the present disclosure further provides a display panel, as shown in FIG. 2, comprising a first substrate 101 and a second substrate 104 disposed oppositely, liquid crystal 106 is disposed between the first substrate 101 and the second substrate 104, and a sealant 107 is disposed on an edge of the first substrate 101 or the second substrate 104. The edges of the first substrate 101 and the second substrate 104 are adhered together by the sealant 107. Therefore, the liquid crystal may be contained in a space defined by the first substrate and 101, the second substrate and the sealant 107.

For example, in the display panel provided by at least one embodiment of the present disclosure, the sealant 107 may comprise a polar component and a non-polar component. For example, the polar component may comprise epoxy resin, acrylate, a photoinitiator and a thermal hardening agent. For example, the polar component and the non-polar component will repulse each other when being mixed, and are automatically separated to form multiple layers, and in order for a system to maintain lower interface energy, the non-polar component having lower interface energy will be spontaneously spread on the outer side of a part of the sealant main body 1070 not adhered to the substrate, that is, a first non-polar component enrichment layer 1071 is spontaneously formed on a side of the sealant close to the liquid crystal, as shown in FIG. 2. The non-polar component layer comprises a material with high specific surface area 105, and therefore, the non-polar component is enabled to have an adsorption action for liquid crystal.

Meanwhile, a second non-polar component enrichment layer 1072 may also be spontaneously formed on a side of the sealant 107 away from the liquid crystal, and the second non-polar component enrichment layer 1072 can effectively stop water vapor (water molecules are polar molecules) to protect the display panel.

For example, a thickness of the first non-polar component enrichment layer 1071 and/or the second non-polar component enrichment layer 1072 is from 5 μm to 35 μm, and when a thickness of the first non-polar component enrichment layer 1071 is less than 5 μm, it is unfavorable for the non-polar component to totally cover a side of the sealant close to the liquid crystal, and for adsorption of the liquid crystal. When a thickness of the first non-polar component enrichment layer 1071 is greater than 35 μm, the material with high specific surface area is tend to be overplus, and even an adhesive performance of the sealant may be harmed.

For example, a specific surface area of the material with high specific surface area may be from 200 $m^2/g$ to 1400 $m^2/g$.

For example, the material with high specific surface area comprises one or more of activated carbon, zeolite, aerogel or organometallic complex.

For example, in the sealant composition, a mass ratio of the polar component to the non-polar component may be from 20:1 to 5:1, further, for example, may be from 15:1 to 4:1 and much further, for example, may be from 18:1 to 3:1.

For example, a groove portion 108 may be disposed in the first substrate 101 and/or the second substrate 104, and the groove portion 108 is disposed in a film layer of the first substrate 101 and/or the second substrate 104, and a position of the groove portion 108 corresponds to the sealant main body 1070. For example, part of the sealant main body 1070 is located in the groove portion 108. For example, a width of the groove portion 180 may be from 50 μm to 500 μm, a contact area between the sealant main body 1070 and the substrate may be increased by disposing the groove portion 108, and an adhesive force of the sealant is increased. For example, the width of the groove portion refers to a length of the groove portion in a direction parallel to a substrate where the groove portion is.

According to the sealant composition, the sealant and the manufacturing method thereof, and the display panel provided by at least one embodiment of the present disclosure, by adding the high specific surface area non-polar component into the sealant/sealant composition, the material with high specific surface area is enriched on a side of the sealant close to the liquid crystal, impact force from the liquid crystal is effectively absorbed on a basis of not increasing original process difficulty and ensuring the adhesive performance of the sealant, and a display quality is improved.

For example, in the first non-polar component enrichment layer 1071, an amount of the non-polar component is greater than that of the polar component, and in the second non-polar component enrichment layer 1072, an amount of the non-polar component is greater than that of the polar component. For example, in the first non-polar component enrichment layer 1071 and/or the second non-polar component enrichment layer 1072, a mass percent of the non-polar component may be from 70% to 90%, and further, for example, the mass percent of the non-polar component may be from 80% to 95%. For example, in the sealant main body 1070, an amount of the polar component is greater than that of the non-polar component. For example, in the sealant main body 1070, a mass percent of the polar component may be from 80% to 99%, and further, for example, the mass percent of the polar component may be from 85% to 98%.

In a case without conflicts, the embodiments and features in the embodiments of the present disclosure are combinable mutually. In the embodiments of the present disclosure, the same or similar parts of the sealant composition, the sealant and the manufacturing method thereof, and the display panel are referable mutually.

What is claimed is:

1. A display panel, comprising a first substrate and a second substrate disposed oppositely, liquid crystal disposed between the first substrate and the second substrate, and a sealant disposed on an edge of the first substrate or the second substrate,
    wherein the sealant comprises a sealant main body and a first non-polar component enrichment layer, the first non-polar component enrichment layer is located on a side of the sealant close to the liquid crystal, and the first non-polar component enrichment layer comprises a material with a specific surface area of from 200 $m^2/g$ to 1400 $m^2/g$,
    wherein a thickness of the first non-polar component enrichment layer is from 5 μm to 35 μm.

2. The display panel according to claim 1, wherein the material with the specific surface area of from 200 $m^2/g$ to 1400 $m^2/g$ comprises at least one selected from the group consisting of activated carbon, zeolite, aerogel and organometallic complex.

3. The display panel according to claim 1, further comprising a polar component, wherein a mass ratio of the polar component to the non-polar component in the sealant is from 20:1 to 5:1.

4. The display panel according to claim 1, further comprising a groove portion, wherein the groove portion is disposed on at least one of the first substrate and the second substrate, and part of the sealant main body is in the groove portion.

5. The display panel according to claim 4, wherein a width of the groove portion is from 50 μm to 500 μm.

* * * * *